United States Patent [19]

Romeo et al.

[11] 3,978,318

[45] Aug. 31, 1976

[54] HAND-OPERATED SCANNER

[75] Inventors: Frank Candilora Romeo, Marlboro; John Warren Carroll, III, Pepperell, both of Mass.

[73] Assignee: Data General Corporation, Southboro, Mass.

[22] Filed: Nov. 26, 1975

[21] Appl. No.: 635,551

Related U.S. Application Data

[63] Continuation of Ser. No. 452,474, March 18, 1974, abandoned.

[52] U.S. Cl. .......................... 235/61.11 E; 35/35 A; 240/59
[51] Int. Cl.² ......................................... G06K 7/10
[58] Field of Search ............. 235/61.11 E; 35/35 C, 35/35 J, 35 A; 360/117; 240/6.4 W, 52.5, 57

[56] References Cited

UNITED STATES PATENTS 3,674,943   7/1972   Benson .............................. 360/117

Primary Examiner—Vincent P. Canney
Attorney, Agent, or Firm—Jacob Frank; Joel Wall

[57] ABSTRACT

A hand-operated scanner having an inverted T-shaped extension for slideably receiving two adjacent fingers for manipulating the scanner and simultaneously allowing the operator's fingers to remain free for merchandise packaging, merchandise check-out and/or making keyboard entries by artful placement of the extension in relation to the scanner reading head.

8 Claims, 5 Drawing Figures

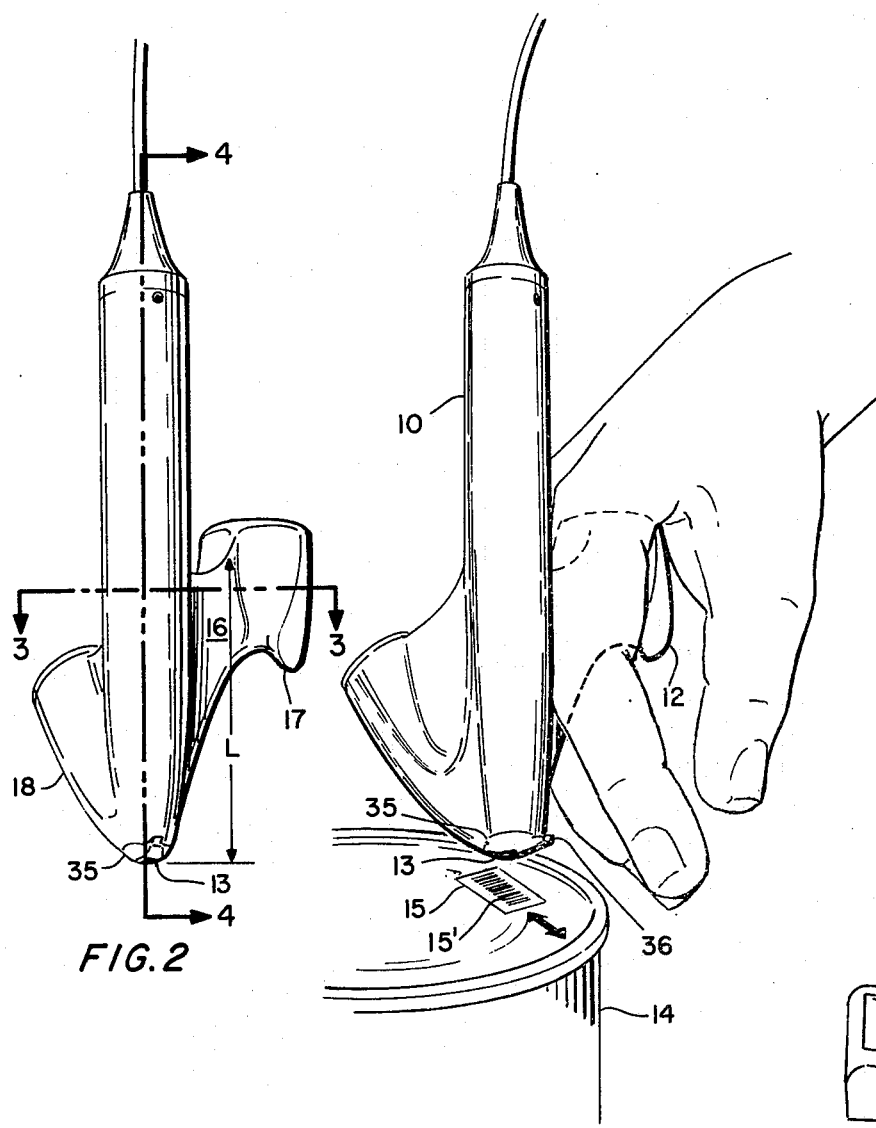
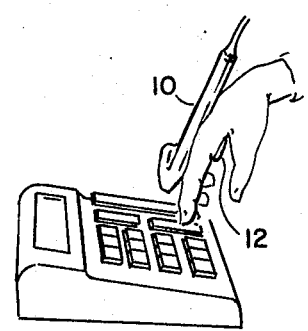
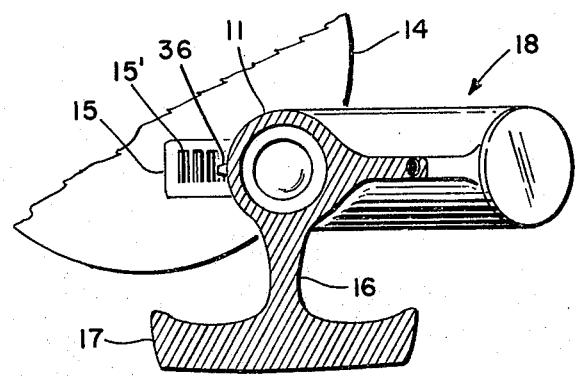
FIG. 2
FIG. 1
FIG. 5
FIG. 3

HAND-OPERATED SCANNER

This is a continuation, of application Ser. No. 452,474 filed Mar. 18, 1974 now abandoned.

BACKGROUND OF THE INVENTION

1. Field of the Invention

The present invention relates to a scanning device, and more particularly, to a hand-operated scanner which is designed to be readily moved over a data bearing medium.

2. Description of the Prior Art

In the field of scanning systems for use in operations where data is to be scanned from sheets, cards, or piece goods, hang tags or labels, the use of a hand-operated scanner for data capture is a valuable tool to an overall scanning system. This is especially so when piece goods are individually handled such as in point of sale operations involving check-out counter applications in retail stores and supermarkets. The hand scanner, if properly designed, lends itself to effectively scan surfaces of virtually all shapes and sizes of piece goods, thus increasing the percentage of scannable piece goods that may be employed in such systems. Obviously, this better justifies the utilization of such systems from an economic standpoint. Further, the availability of a hand scanner provides for an adaptable scanning system capable of accommodating large as well as small retail operations. Aside from being useable as the primary unit, such a hand-operated scanner is a handy substitute for systems utilizing a larger fixed automatic unit which may be in need of replacement or repair. In a retail point of sale environment, the economics dictate that it is highly desirable to have a single operator at a checkout station. Accordingly, it is important that the operator not be handicapped and be able to freely manipulate his fingers for performing the normal functions in such a position. This includes allowing all of the operator's fingers of both hands to be free for moving items to be scanned for packaging items and/or to make keyboard entries. Obviously, it would be extremely awkward if it were necessary for the operator to put the scanner down for performing these functions. Not only would the scanner experience considerable mishandling, but in addition, the act would be quite time consuming.

SUMMARY

It is a primary object of the present invention to provide a hand-operated scanner designed to be used by an operator, yet simultaneously permitting all of the fingers of the operator's hand to be free for handling items to be checked-out and scanned, to make keyboard inputs and/or for packaging of the checked-out items. The above is accomplished by utilization of a configuration that would extend from the main body of a scanner which may be readily inserted and securely held between two adjacent fingers whereby the extension is strategically located on the scanner to allow the operator's fingers, when extended in an outward fashion, to project beyond the scanner head which would be contiguous with a data bearing medium.

Another object of the present invention is to provide a scanner adapted to be readily grasped and securely held by a single hand without the use of attachments, and allowing all the fingers on the hand holding the scanner to be free for other purposes.

A further object of the present invention is to provide for a hand-operated scanner adapted to be firmly held by a minimum of two adjacent fingers of a hand and which may be easily directed across a data bearing medium.

Yet another object of the present invention is to provide for conveniently designed hand-operated optical scanner allowing for easy handling by at least two adjacent maneuverable fingers, yet avoid contact of the hand with the heated illuminated area.

BRIEF DESCRIPTION OF THE DRAWINGS

FIG. 1 is a perspective view of the scanner in its hand held position over a data bearing label attached to a can shaped object.

FIG. 2 is a perspective view of the hand-operated scanner.

FIG. 3 is a sectional view of the hand held scanner taken across lines 3—3' of FIG. 2.

FIG. 5 is a perspective view of the scanner showing the ability of an operator to simultaneously hold the scanner and make keyboard entries.

DESCRIPTION OF THE PREFERRED EMBODIMENT

Figure 4:
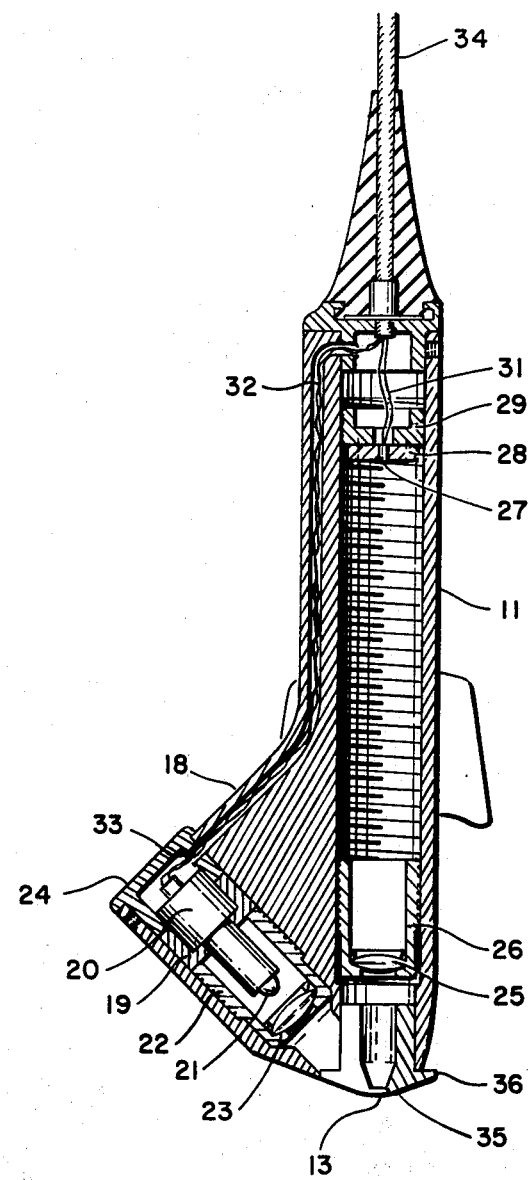
FIG. 4 is a sectional view of the scanner taken along line 4—4' of FIG. 2.

The device of the present invention is a hand-operated scanner which is used to scan intelligence from a data bearing medium to convert the scanned data to the form of electrical signals which are routed for recognition purposes to any one of numerous well-known types of recognition logic techniques. The data on the label could be magnetic print, or of other forms, in which case appropriate and suitable corresponding sensing techniques would be utilized for reading the data. The embodiment of the present invention, however, shows an optical hand-operated scanner adapted to scan a printed label.

Although the optical hand-operated scanner of the present invention will be shown to be used for reading a coded label on a merchandising item, it will be understood that the apparatus is adapted to read various types of printed documents whether or not associated with merchandising items and for character recognition purposes.

In turning to the drawings, with reference to FIG. 1, an optical scanner 10 is shown to include an extension 12 which is inserted between two adjacent fingers of an operator's hand where an aperture 13 of the scanner is positioned by the operator at the top of a merchandising item 14 such as canned goods, and in particular, contiguous with a label 15 containing coded data 15' over which the scanner is manually moved in a direction perpendicular to the bars of the coded data. Although extension 12 is shown with an elongated scanner housing 11, it should be understood that most any suitably shaped housing could be used with extension 12.

A better view of the extension 12 by which the scanner is grasped, may best be seen with reference to FIGS. 2 and 3 wherein the extension 12 is shown to have a T shape configuration comprising vertical member 16 intersecting a horizontal member 17. The horizontal member 17 has an airfoil shape with an essentially flat bottom and curved upper portions to compliment the inner curvature of two adjacent fingers. The complimentary curved upper portions are adapted to matingly receive at least two adjacent fingers of either hand. The outer portions of the horizontal member are formed with ridges to provide for better grasping the extension 12, allowing for better control in manipulating the scanner 10.

As is also illustrated, the vertical member 16 is integrally formed with housing 11 of the main elongated scanner body 10 in such a manner that its line of contact is drawn out in a direction opposite to that from which the fingers will be applied to extension 12. In order to allow the fingers of an average adult to be extended beyond the aperture 13, the distance L from the aperture 13 to the furthest backside position of the vertical member 16 which is to fit in the groove of two adjacent fingers at the palm, should be between 1½ to 3 inches. The line of contact between housing 11 and vertical member 16 extends down toward the scanner aperture 13 to provide for better control over the scanner 10 since, as illustrated, the greater bulk and weight of the scanner lies in this area.

In turning to FIG. 4, it may be seen that a slanted wing-like member 18 is extended back away from the aperture end of the scanner 11, wherein there is contained an adapter bushing 19 for seating a lamp socket 20 which in turn holds a lamp 21 and lens 23. A mounting member 22 is disposed beneath the lamp for fixedly seating lens 23. A friction fitted cover 24 allows for easy access to the lamp for bulb replacement, as may be necessary. The lamp 19 and lens 21 are so positioned, to focus the lamp emitted light at the aperture 13.

To capture the light reflected from the label being scanned, the main body of the scanner 10 is provided with a lens 25 mounted in a lens holder 26 near the aperture for focusing light onto a photosensor 27, such as a photodiode seated in a threadably adjustable base 28 and fixedly secured by a holder 29. The reflected optical signals are converted into electrical signals which are passed through lead wires 31 to suitable decoding circuitry. The housing 11 within which the optics is contained, is also provided with a conduit 32 through which the lead wires 33 from the lamp are routed and joined with lead wires 31 to be contained, within a flexible lead cord 34.

As will be appreciated, the scanner system is so designed so that its heat generating area in the wing portion 18 is positioned for convenient access, yet away from the operator's hand.

Another feature of the present invention is the provision of a guide member 36 which is arranged to be observed by an operator when a scanning operation takes place, as is illustrated in FIG. 3. The guide member, which is an integral part of a piece 35 forming part of the reading aperture, is utilized by allowing an operator to ensure that the reading aperture is being passed across the central portion of the coded data 15', thereby eliminating the guesswork.

As is readily evident from FIG. 1, the operator might easily grasp the scanner 11 with a single free hand between two adjacent fingers, yet allow full use of the entire hand for handling merchandise by packaging items and/or checking out items. The extension 12 is also artfully located so that the fingers, when extended, project beyond the reading aperture 13 allowing one to use that same hand and those same freely maneuverable fingers for making keyboard inputs, as is depicted in FIG. 5.

What is claimed is:

1. A hand-operated scanner for scanning a printed data bearing medium by photo-optical means comprising:
    housing means provided with a reading aperture end adapted to be placed contiguous with and moved over, the data bearing medium;
    illumination means mounted in said housing means to provide for illumination at the reading aperture;
    photosensitive means mounted on said housing and adapted to receive through said reading aperture, reflected illumination from the data to be read;
    holding means extending from said housing including an inverted T shaped configuration for receiving at least two adjacent fingers of an operator's hand for manipulation of the scanner; and,
    guide means attached to said housing means at said reading aperture end and projected outwardly to allow a visual check for manual registration of the reading aperture end with the data to be scanned.

2. In a hand-operated scanner according to claim 1 wherein said T shaped configuration comprises a horizontal member of airfoil configuration having a cross-section which increases in thickness in the direction towards the reading aperture.

3. In a hand-operated scanner according to claim 2 wherein the outer portions of said horizontal member are provided with ridges.

4. In a hand-operated scanner according to claim 3 wherein said vertical member is integrally connected with said housing means over an extended area in the direction toward said reading aperture.

5. In a hand-operated scanner according to claim 4 wherein said housing means includes wing-like extension means containing said illuminating means.

6. In a hand-operated scanner according to claim 4 wherein the shortest distance between a plane at which the reading aperture is positioned and the furthest portion of the horizontal member for receiving two adjacent fingers is between 1½ to 3 inches.

7. A hand-operated scanner for scanning a printed data-bearing medium by photo-optical means comprising:
    housing means provided with a reading aperture end adapted to be placed contiguous with and moved over the data-bearing medium;
    illumination means mounted in said housing means in a manner to avoid contact between said hand and heat from said illumination means to provide for illumination at the reading aperture;
    photosensitive means mounted on said housing and adapted to receive through said reading aperture, reflected illumination from the data to be read; and,
    holding means, rigidly connected to said housing means and adapted to matingly receive at least two adjacent fingers of said hand, for permitting (1) secure grasping of said holding means and thereby said housing means when scanning said printed data-bearing medium and for permitting (2) continued holding of said housing means when said fingers are extended and freely maneuverable even beyond said reading aperture end when not scanning said printed data-bearing medium.

8. A hand operated scanner according to claim 7 including:
    guide means attached to said housing means at said reading aperture end and projected outwardly to allow a visual check for manual registration of the reading aperture end with the data to be scanned.

* * * * *